M. E. BLOOD.

PARCEL CARRIER FOR BICYCLES.

No. 11,301. Reissued Jan. 17, 1893.

Witnesses:

Walter S. Wood

Fannie L. Pichin

Inventor.

Maurice E. Blood

THE NORRIS PETERS CO., PHOTO-LITHO., WASHINGTON, D. C.

UNITED STATES PATENT OFFICE.

MAURICE E. BLOOD, OF KALAMAZOO, MICHIGAN, ASSIGNOR TO MARY L. BLOOD, OF SAME PLACE.

PARCEL-CARRIER FOR BICYCLES.

SPECIFICATION forming part of Reissued Letters Patent No. 11,301, dated January 17, 1893.

Original No. 446,248, dated February 17, 1891. Application for reissue filed October 22, 1891. Serial No. 409,557.

*To all whom it may concern:*

Be it known that I, MAURICE E. BLOOD, a citizen of the United States, residing at Kalamazoo, in the county of Kalamazoo and State of Michigan, have invented a new and useful Parcel-Carrier for Bicycles, of which the following is a specification.

The object of my invention is to provide a simple and light device that can be easily attached to or detached from a bicycle for carrying bundles, parcels, clothing and many things which bicycle-riders desire to carry but find it difficult to carry in their hands or tie to the bicycle. I attain this object by a device illustrated in the accompanying drawings, in which—

Figure 1:
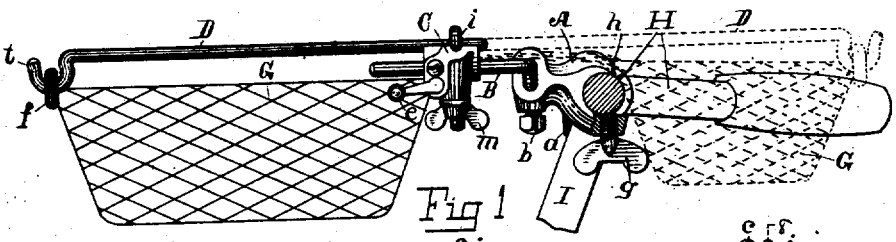
Figure 2:
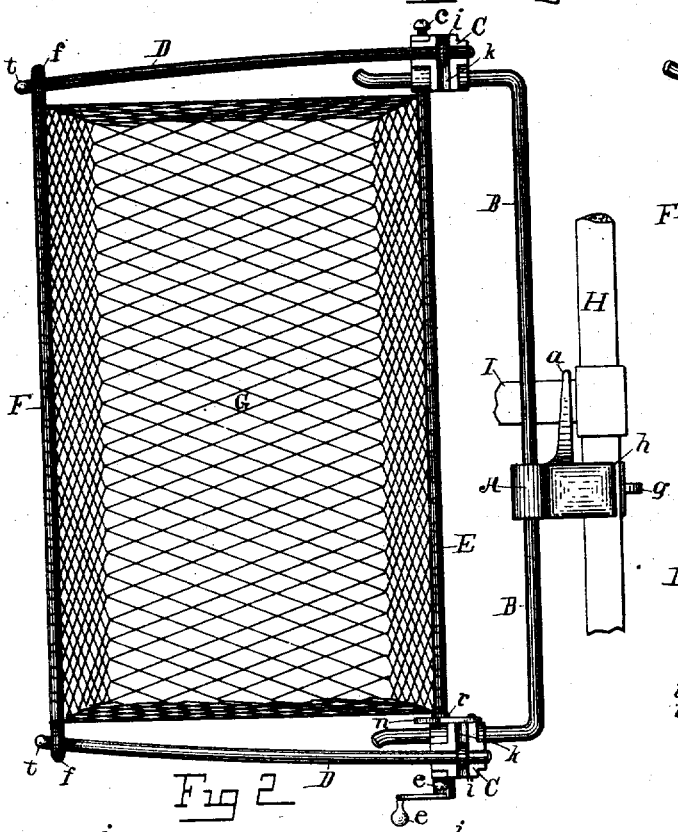
Figure 3:
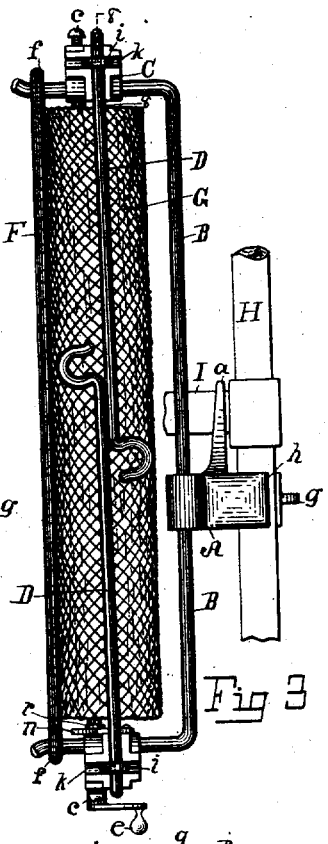
Figure 4:
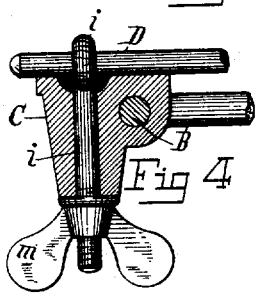
Figure 5:
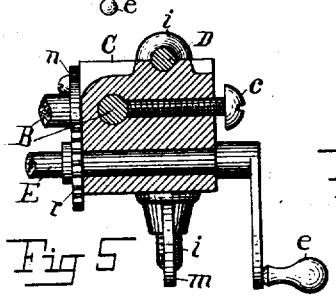
Figure 6:
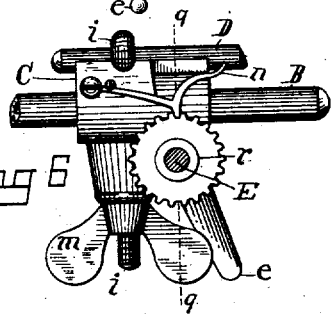
Figure 7:
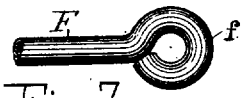

Figure 1 is an end elevation of the carrier, showing it attached to the handle-bar of a bicycle and projecting in front of the handle-bar, which would be over the forward wheel of a bicycle. The dotted lines show the carrier as used in another position behind the handle-bar. Fig. 2 is a top view; Fig. 3, a top view showing the carrier rolled up and folded as it is carried when not in use; Fig. 4, an enlarged detail, being a vertical section through the right-hand side block on line 8 8, Fig. 3; Fig. 5, a vertical section through the left hand side block on line 9 9, Fig. 6; Fig. 6, an enlarged detail, being an inside vertical view of the left-hand side block showing the dog and ratchet or notched wheel for holding the windlass or roller in position; and Fig. 7, an enlarged detail, being a vertical view of one end of the front support or rod of the carrier.

In the drawings a whole bicycle is not shown, only enough—viz., a broken section of the handle-bar and handle-bar posts to which the invention is attached—to show the relation of the carrier to the bicycle.

Similar letters refer to similar parts throughout the several views.

The handle-bar connecting casting A, bail B, side blocks C C, and side supports D D constitute the frame-work of the carrier, while the windlass or roller E and the rod F form the rear and forward supports of the net or bag G.

H represents a section of a bicycle handle-bar, and I is the upper part of the bicycle-post to which the handle-bar is attached.

The casting A is made with an opening in the rear part to fit the handle-bar of a bicycle near the post I, and is secured rigidly to the handle-bar by means of a thumb-screw *g* in its lower part, which, when turned up acts as a set-screw against the handle-bar. On the opposite side of the handle-bar the casting A is made to curve around the handle-bar, forming a hook *h*, which is drawn against the handle-bar when the thumb-screw *g* is screwed up and prevents the casting A from slipping off in a forward direction. The opening in the casting A must be large enough to admit the bicycle handle-bar. The stop-finger *a* is made to project from the lower part of the casting A to come in front of and against the handle-bar post I. This is to aid in preventing the casting A from turning on the handle-bar when there is a heavy weight in the carrier in front of the handle-bar.

The bail B passes through the forward part of the casting A and is held in its place by a set-screw *b*. This bail is made of spring-wire or any suitable material and to come in front of the handle-bar and to run along parallel with the handle-bar about the length of the net or bag which forms the receptacle of the carrier. At these points each end of the bail is bent forward at right angles to the handle-bar and projects forward far enough to receive the side blocks C C, and through these blocks far enough to receive the eye at each end of the front rod F when the net or bag is rolled up on the windlass E.

The side blocks C C can be cast of iron, brass, or any suitable material and secured to the bail by means of the set-screws *c c*. There is a hole through each of these side blocks, running parallel with the handle-bar, which forms a bearing for the windlass or roller E. This windlass or roller passes through the side blocks, running from one to the other, and lies parallel with the handle-bar. There are crosswise grooves in the upper face of the side blocks C C to receive the side supports D D. These side supports are made of spring-wire or any suitable material and bent at their forward ends to form a hook *t* to receive the eyes of the front rod F when the carrier is set for use. The side supports D D are secured to the side blocks by means of the eyebolts *i i*, the side supports passing through the eyes of these bolts, which eyes are in the countersunk hole in the side blocks at a point where the crosswise grooves *k k k k* intersect or cross each other, and are drawn down into the grooves by screwing up the thumb-nuts *m m* on the opposite ends of the eyebolts. These eyebolts pass through a vertical hole in the side blocks and the thumb-nuts *m m* screw up against the lower side of the side blocks. In this manner the side supports D D can be made to project out from the side blocks in four different directions—viz., in front to set the carrier net or bag forward of the handle-bar and to the rear to set the net or bag at the rear of the handle-bar, as shown in Fig. 1, toward the center when the carrier is rolled up and folded, as shown in Fig. 3, and they can be extended out side-wise of the bicycle to allow long articles to be tied to them or to admit of hanging a pail, basket, or any other article at their outer ends. They can also be projected in these directions their full length or any part to make the net or bag large or small or for any other purpose. By making the side supports D D of spring-wire they will be elastic and allow the articles in the carrier to be carried without being jarred by the motion of the bicycle, as they would be were the side supports made more rigid. The windlass or roller E is made of a rod or roller which has bearings at or near each end in the side blocks C C. The outer end at the left-hand side block has formed or attached thereon a crank *e*, by which the windlass is turned to wind up the net or bag. The dog *n* and notched wheel *r* just inside of the left-hand side block holds the windlass or roller in place where desired, the notched wheel being secured to the windlass and the dog pivoted to side block.

The front rod or support F can be made of wire, the same as the side supports, and has an eye formed on each end to go over the hooks on the side supports. This rod is made short enough to draw the ends of the side supports together a little, so as to make the whole taut and keep the wires from rattling on each other. The length of the rod F is also such as to allow the eyes on its outer ends to go over the forward ends of the bail B and also spring them in together a little for the same purpose as with the side supports. The rod F is placed in the latter position when the net or bag is rolled up or when desired to make a bag without extending the side supports D D. The bag will then hang down close to the handle-bar post and the opening will be nearly closed at the top.

The net or bag G can be made of twine in the usual manner of making nets, but made in the form of a bag, as shown in Figs. 1 and 2. This bag might also be made of cloth, leather, or other material than netting; but I prefer the net because it is light and strong and admits of the tying of strings through the meshes to tie on the articles carried when so desired. It is supported at its forward part by the rod F and at its rear side or part by the windlass or roller E. It is secured to the windlass in a manner to make it wind up around the windlass when the windlass is revolved. The side supports of the net or bag can be made of cords secured to the front rod and running back to the windlass.

There are two ways in which the net or bag can be set behind the handle-bar. One is to set the side supports D D to the rear of the handle-bar and place the front rod F in the hooks of the side supports on that side, allowing the net or bag to fall over the handle-bar and form a bag on the rear side of it. The other way is to swing the side supports and net or bag all together over the handle-bar, the whole pivoting in the casting A on the rear part of the bail B. The carrier will then be turned bottom side up, but will operate as well in that way to carry the load.

To set the carrier for use the casting A is secured to the handle-bar near the post by turning up the thumb-screw *g*. Then the side supports D D are set in the grooves in the side blocks to project forward or rearward, as may be desired, according to the size and kind of load to be carried. The carrier is made to carry a larger load forward of than behind the handle-bar. When the side supports D D are in the right position, the thumb-nuts *m m* on the eyebolts are then turned up tight and the front rod F hung on the hooks at the outer end of the side supports. The article to be carried is then placed inside the net or bag and tied or not as desired.

If the articles to be carried are small or in such a shape as to go through the meshes of the net, they should be rolled up in a paper before being put in the net.

When the net or bag is not to be used, the front rod F is removed from the hooks of the side supports, the crank *e* turned, and the net or bag rolled up on the windlass until it is all rolled up and the rod F drawn up alongside of the rolled net, when the front rod is hung on the front ends of the bail and the dog *n* dropped into a notch of the notched wheel *r*. The thumb-nuts *m m* are then loosened and the side supports D D turned around to lie on top of the roll of netting. Then the thumb-nuts are tightened up and the whole carrier will occupy but little space, will ride without rattling or making a noise, and when made well and neatly will not be an ungainly-looking object on a bicycle. When the rider does not wish to use it at all, he has only to loosen the thumb-screw *g* and take the carrier off of the bicycle.

The casting A, bail B, and side blocks C C might be formed of a single casting or piece of metal; but in that manner the bail could not be made to swing in the casting A. The casting A might be made to attach to the post I of a bicycle; but I prefer putting it on the handle-bar.

I am aware that carrier attachments for bicycles have been used before, consisting of straps and spring-clamps attached to the handle-bar and bags tied onto different parts of a bicycle; but I do not know that a bag has ever before been suspended on arms projecting from the handle-bar. One great advantage of having a bag suspended in this manner is that the bag is carried steadily along and cannot swing around with its contents and strike against the rider or different parts of the bicycle; and a bag suspended in this manner has advantages over any strapping or clamping device on account of being able to hold and carry many articles thrown in loosely that it would be almost impossible to hold with straps or clamps, and by making the sides of the bag square or rectangular instead of round, there is a better chance to carry books, long straight packages, and such articles than there would be in a round bag.

What I claim as new and desire to secure by Letters Patent, is—

1. A parcel-carrier for bicycles, consisting of a rectangular frame projecting from the handle-bar or handle-bar post of a bicycle, and a bag hanging down from the said frame, and attached at its upper edges to the said frame in such a manner as to make a rectangular opening to the bag, substantially as and for the purposes specified.

2. A parcel-carrier for bicycles, the receptacle being made of netting and of a form to have a bottom and sides rising up all around the bottom to form a rectangular opening at the top, the upper edges of the net being supported by a frame which projects from the handle-bar or handle-bar post of the bicycle, substantially as and for the purposes specified.

3. In a parcel-carrier for bicycles, the receptacle being a bag having a windlass to support its rear upper edge and a rod running parallel with the windlass to support its front upper edge, the windlass adapted to roll the bag around itself and draw the front rod up close to and along the side of itself when the bag is rolled up, substantially as and for the purposes specified.

4. A parcel-carrier for bicycles, made to be secured to the handle-bar or handle-bar post of a bicycle, the receptacle being made in the form of a bag and adapted to be set either in front or at the rear of the bicycle handle-bar, substantially as and for the purposes specified.

5. In combination with a parcel-carrier for bicycles, to be secured to the handle-bar of a bicycle, a stop or projection *a*, resting against the handle-bar post to prevent the carrier from turning on the handle-bar and dropping down, substantially as and for the purposes specified.

6. A parcel-carrier for bicycles, the receptacle being made in the form of a bag, in combination with side supports D D, bail B, casting A, thumb-screw *g*, and stop *a*, substantially as specified.

7. A parcel-carrier for bicycles, the receptacle being made in the form of a bag, in combination with the side supports D D, adapted to be set to project out forward from the handle-bar to the rear of the handle-bar or to lie parallel with the handle-bar, substantially as and for the purposes specified.

8. In a parcel-carrier for bicycles, secured to the handle-bar or handle-bar post of a bicycle, the receptacle being in the form of a bag, the combination of the grooved side blocks C C, side supports D D, and eyebolts *i i*, substantially as and for the purposes specified.

9. In a parcel-carrier secured to the handle-bar or handle-bar post of a bicycle, the receptacle, being made in the form of a bag—a casting A, bail B, side blocks C C, side supports D D, and bag G, all arranged and adapted for use substantially as and for the purposes specified.

10. In a parcel-carrier for bicycles secured to the handle-bar or handle-bar post of a bicycle, the casting A, bail B, side blocks C C, side supports D D, windlass E, and bag G, all arranged and adapted to be used, substantially as and for the purposes specified.

11. In a parcel-carrier secured to the handle-bar of a bicycle, the casting A—bail B, side blocks C C, side supports D D, windlass E, front rod F, and bag G, all arranged and adapted for use, substantially as and for the purposes specified.

12. In a parcel-carrier for bicycles, the receptacle being made in the form of a bag, a windlass or roller E, in combination with a bail B, having its outer ends projecting forward of the windlass, to receive the ends of the rod F, substantially as and for the purposes specified.

13. A parcel-carrier for bicycles, made to be secured to the handle-bar or handle-bar post of a bicycle, adapted to be rolled up and folded together to lie close to and parallel with the handle-bar, substantially as and for the purposes specified.

MAURICE E. BLOOD.

Witnesses:
FANNIE L. PREHN,
ADDIE E. SCHUMACHER.